Nov. 14, 1933.  H. R. RANKEN  1,934,882
MEASURING APPARATUS
Filed June 16, 1932  4 Sheets-Sheet 2
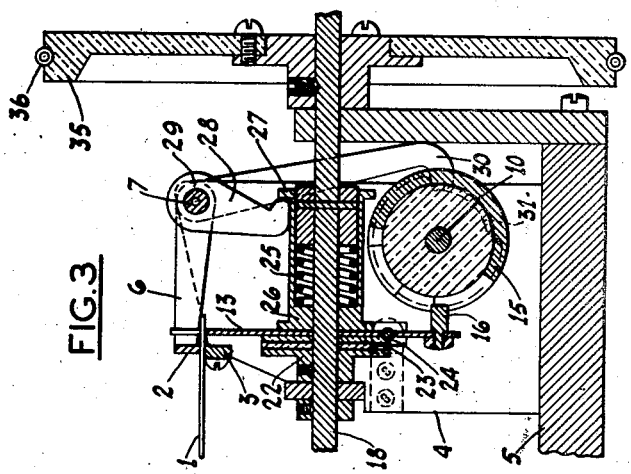
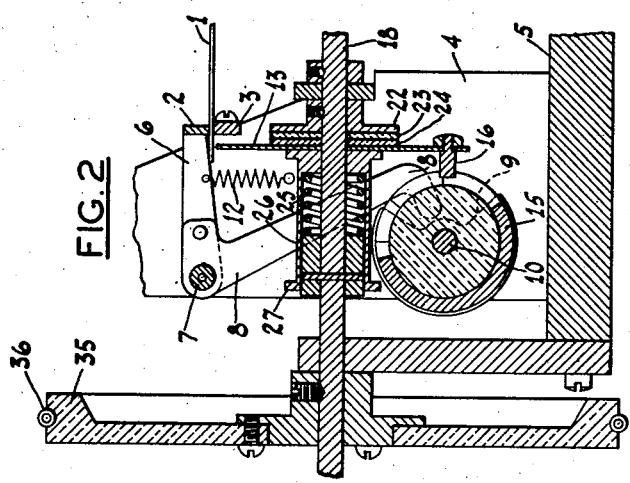
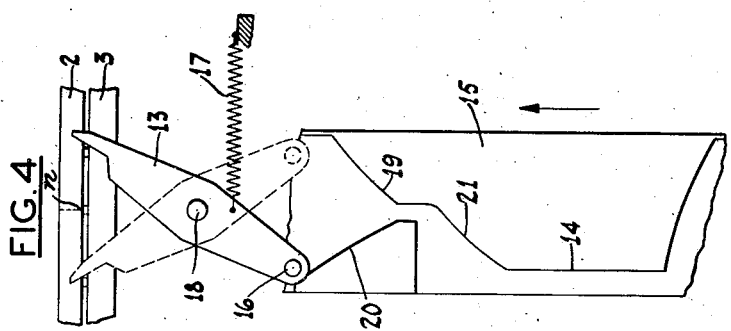
INVENTOR

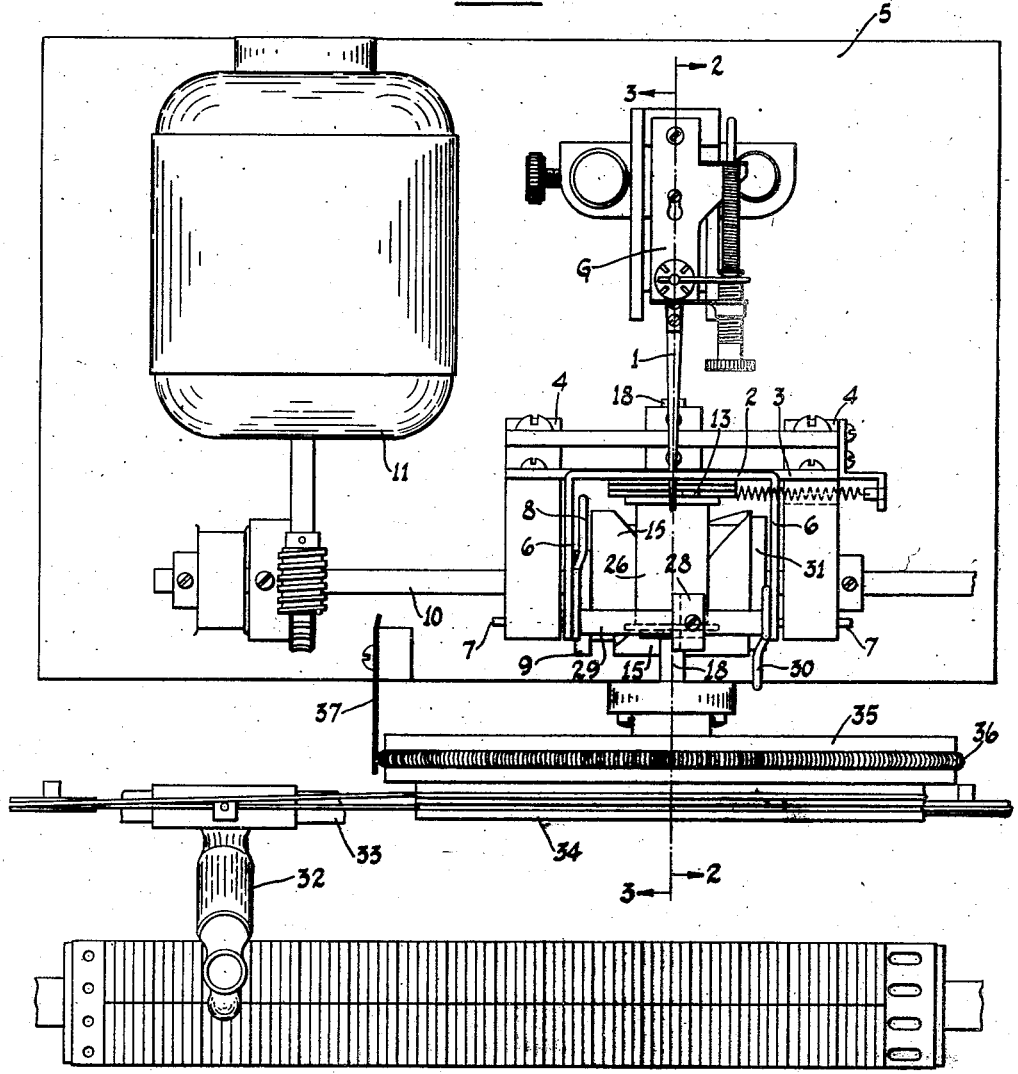

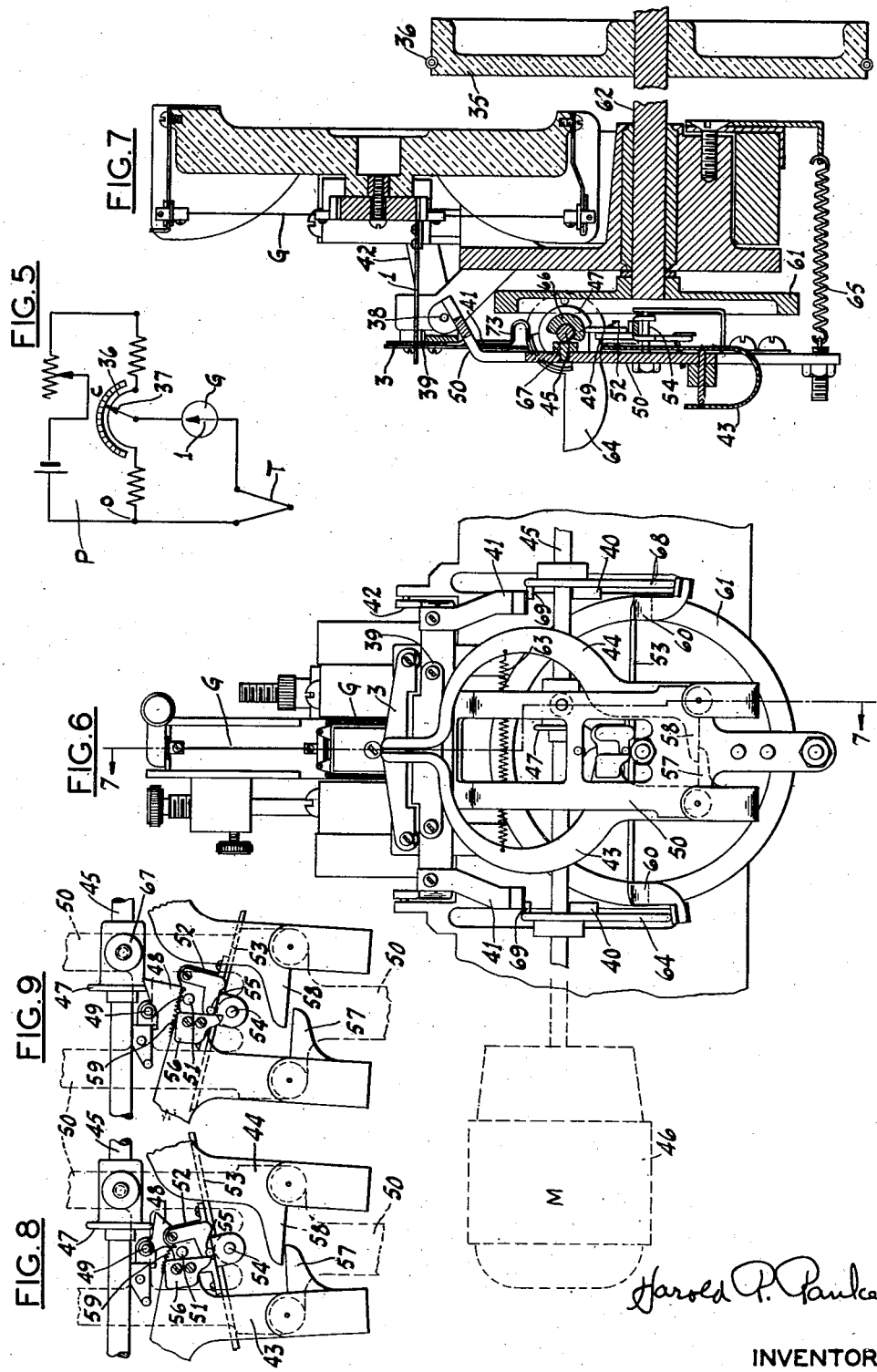

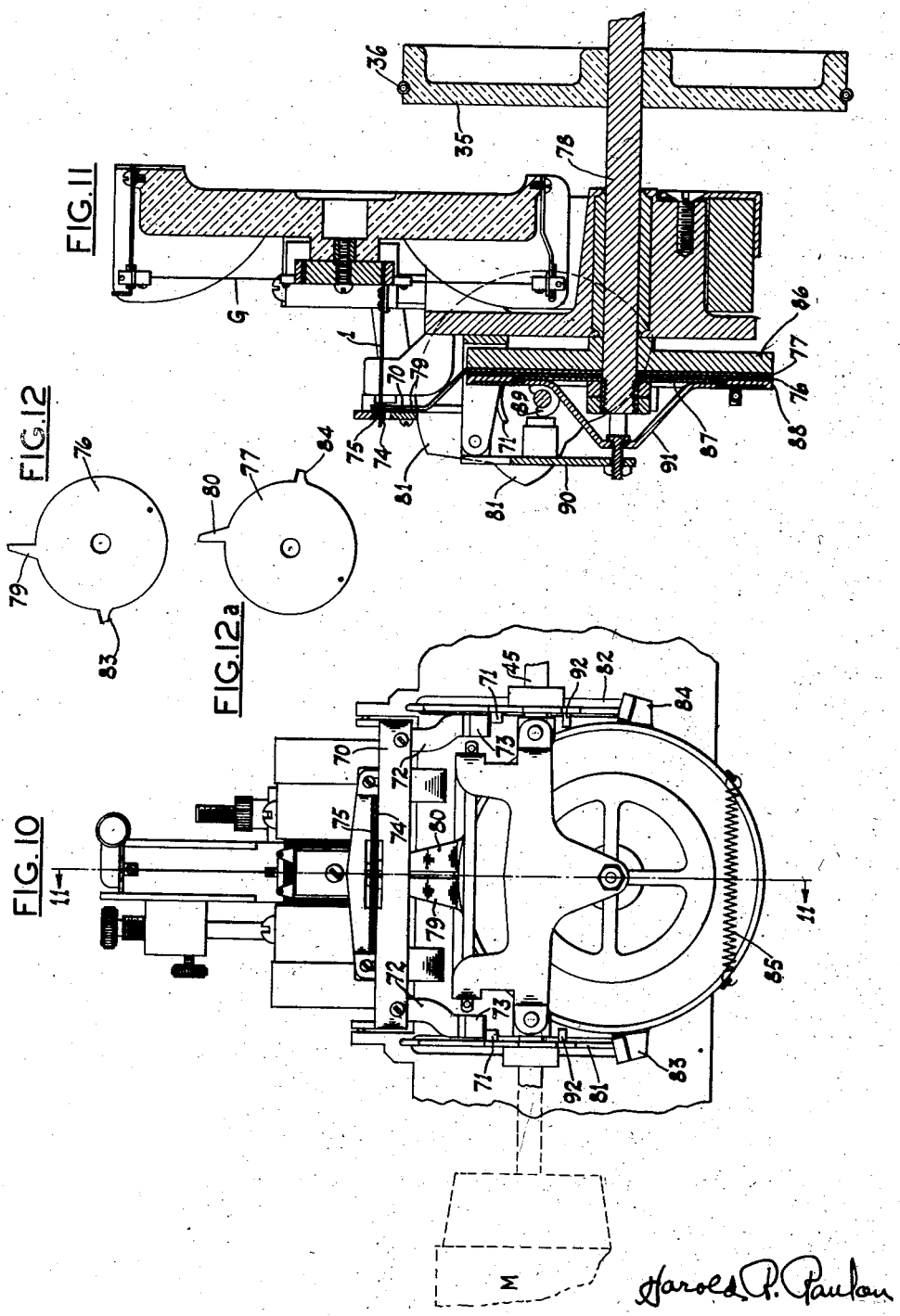

Patented Nov. 14, 1933

1,934,882

UNITED STATES PATENT OFFICE 1,934,882

MEASURING APPARATUS

Harold R. Ranken, Philadelphia, Pa., assignor to Leeds & Northrup Company, Philadelphia, Pa., a corporation of Pennsylvania Application June 16, 1932. Serial No. 617,496

32 Claims. (Cl. 171—95)

My invention relates to a system of and apparatus for measuring, indicating, recording, or controlling physical, chemical, electrical, or other conditions, and their changes or variations.

In accordance with my invention, a pointer, or equivalent, deflecting in response to unbalancing of a measuring system is intermittently clamped, and while it is clamped, a feeler is moved, as by a spring, or equivalent, until arrested by the pointer to position a controlled member, as a driving clutch member, movable by or integral with the feeler in accordance with the pointer's deflection.

More specifically, during rebalancing of the system, the pointer is returned to neutral independently of the rebalancing and more particularly, the pointer is mechanically moved to neutral by the feeler; and in at least some forms of my invention, the needle is momentarily clamped just after its return to neutral to steady it.

Further in some forms of my invention, the feeler is concentric with a driven clutch member, and may itself constitute the driving clutch member; more specifically, it may be provided with an arm adapted to be engaged by a resetting cam while the clutch members are held together.

Further in accordance with my invention, two feelers may be used, one on each side of the pointer, and when one feeler engages the clamped pointer, the movement of the other or free feeler toward it, as by a spring connecting the feelers, is utilized to position a driving clutch member, which in one modification of my invention is movable with the other feeler as a unit.

My invention further resides in the features of combination, construction and arrangement hereinafter described and claimed.

For an understanding of my invention and for illustration of some of the forms it may take, reference is to be had to the accompanying drawings in which:

Fig. 1 is a plan view of recording mechanism.

Figs. 2 and 3 are side elevational views, in section, taken respectively on lines 2—2 and 3—3 of Fig. 1.

Fig. 4 is a detail view with cylindrical cam structure of Figs. 1 to 3 shown in development.

Fig. 5 is a wired diagram of a measuring system referred to in discussion of the operation of recording mechanisms.

Fig. 6 is a front elevational view of another form of my apparatus.

Fig. 7 is a side elevational view in section taken on lines 7—7 of Fig. 6.

Figs. 8 and 9 are detail views, and on enlarged scale of parts appearing in Figs. 6 and 7.

Fig. 10 is a front elevational view of a further modification of the invention.

Fig. 11 is a side elevational view taken in section on line 11—11 of Fig. 10.

Figs. 12 and 12a are detail views on reduced scale, of clutch disks shown in Figs. 10 and 11.

Referring to Fig. 1, the pointer or needle 1 is adapted to deflect in response to change in the particular condition under measurement, for example, temperature, pressure, etc. The particular measuring system with which the pointer is associated is no part of the invention and may be of any known type. Specifically, however, the pointer 1 may be the needle of a galvanometer G included in an electrical measuring circuit of a type hereinafter generally described. The pointer is intermittently clamped in its deflected position between the two clamping members 2 and 3. The lower clamping member may be, as shown, a stationary bar attached to the standards or supports 4 extending upwardly from the base 5 of the instrument. The upper clamping member 2 is carried by or intgral with the arms 6 pivoted on the shaft 7. An operating arm or lever 8 for the upper clamping member bears at its lower end against the cam 9 which is mounted upon the shaft 10 driven at constant speed by the motor 11 or equivalent.

Once for each revolution of cam 9, the arm 8 drops off the high part of the cam permitting the spring 12 to move levers 6 in clockwise direction as viewed in Fig. 2, to clamp the needle 1. The clamping force is determined by spring 12 and is preferably made only sufficiently great to overcome the small force required to arrest the feeler mechanism hereinafter described. Moreover, the clamping force will be constant and substantially independent of wear of the parts.

The feeler 13, during a substantial portion of the cycle for which the needle 1 is unclamped and free to respond to changes in the condition under measurement, is held by the portion 14 of cam 15 to the full line position shown in Fig. 4, i. e., to a position substantially removed from the neutral position of the needle, which is the central position shown in Fig. 1. The relation of cams 9 and 15 is such that the needle 1 is clamped in its deflected position just before the cam follower 16 of the feeler rides off the high part 14 of cam 15.

The spring 17 having one end attached to the feeler 13 is now free to rotate the feeler in a counterclockwise direction about the pivot 18.

The tension of the spring, however, is suitably small so that when the feeler 13 engages the clamped needle 1 it is arrested, the force of the spring 17 being unable to overcome the friction between the needle and its clamping members 2, 3.

If the needle when clamped is at its neutral position $n$, Fig. 4, the feeler 13 swings through an arc of such extent that the cam follower 16 at the lower end thereof is midway between the cam surfaces 19 and 20 of cam 15 so that it engages neither of them upon further rotation of cam 15. The feeler remains in its neutral or central position until the cam follower 16 engages the rise 21 of cam 15 which returns it to its original position, the full line position shown.

If, however, the needle, when clamped, is deflected to one side or the other of its neutral position, it, by arresting the feeler, positions the cam follower 16 in the path of one or the other of the cam surfaces 19, 20, depending upon the sense of deflection of the needle from zero so that one or the other of these cam surfaces is effective to move the feeler 13 to its neutral or central position, Fig. 1. This resetting movement of the feeler is utilized as now described.

During its pointer-seeking movement, the feeler 13 is free of shaft 18, but during the portion of the cycle of operation when the cam follower 16 of the feeler is adapted to be engaged and moved by cam surfaces 19 or 20, it is mechanically coupled to the shaft so that the resetting movement of feeler 13 to its neutral position effects movement of shaft 18 in a corresponding sense and to a corresponding extent, i. e., the shaft is rotated in one direction when the needle is clamped to one side of its neutral position and is rotated in reverse direction when the needle is clamped on the other side of its neutral position, and the extent of movement is dependent upon the distance between the position at which the needle is clamped and its neutral position.

The mechanism for disengageably connecting the feeler 13 to shaft 18 is most clearly shown in Figs. 2 and 3. One side of the plate 22 suitably held to shaft 18, is preferably provided with a cork facing 23 adapted to engage a facing of like material 24 attached to feeler 13. A spring 25 within the cylindrical member 26 forces the latter against the feeler 13 so that there is considerable pressure between the clutch faces 23 and 24 of these elements.

The front end of the cylinder 26 is provided with a flange 27 adapted to be engaged by an arm 28 carried by sleeve 29 surrounding and rotatable upon shaft 7. The lower end of arm 30 bears against cam 31 rotatable with shaft 10. For a considerable portion of the cycle of operation, which corresponds to the time of one revolution of shaft 10, the arm 30, whose upper end is connected to sleeve 29, cooperates with cam 31 to compress spring 25, leaving the feeler 13 free of shaft 18. When, however, in the cycle, the feeler 13 is arrested by the clamped pointer, the cam 31 operates arm 30 to release spring 25 so that it clamps the feeler against the driven clutch member 22. Movement of the feeler 13 by cam surfaces 19 or 20, as above described, is therefore communicated to shaft 18.

Assuming that the needle when clamped is to the right of neutral, as shown in Fig. 4, it is returned to its neutral position by the feeler 13 later in the cycle when the feeler is operated by cam surface 20 to its neutral position at which time the needle is free of jaws 2, 3.

The movement of shaft 18 may be utilized to control the position of any suitable indicating, recording or control structure; specifically, the indicating or recording member 32 may be connected as by cord 33 to a drum 34 attached to shaft 18. There may be also attached to shaft 18 a disk 35 or equivalent carrying a slide wire 36, included in an electrical measuring circuit or system, which is rebalanced by movement of shaft 18.

For a better understanding of the purpose of the apparatus and for illustration of one specific type of measuring system utilizing the apparatus described, reference is made to Fig. 5, in which the potential of a thermocouple T which varies in accordance with changes in temperature being measured, is balanced against a potential developed in the potentiometer network P. Briefly, the slide wire 36 is adjusted, as by relative movement between the slide wire 36 and contact 37, until the voltage between the point $o$ and the point $c$ of the slide wire is equal to the thermocouple voltage. A scale, or equivalent, coacts with the adjustable element of the system to indicate temperature. Under the condition of balance the pointer 1 of the galvanometer G is in neutral position. When, however, the voltages are unbalanced because of a change in temperature, the needle deflects in one direction or the other, whereupon the mechanism of Figs. 1 to 4 operates as above described to change the slide wire setting to restore balance, and concurrently to indicate or record the new value of temperature.

The aforesaid cycle of operation is repeated every few seconds continuously to follow the temperature and to indicate or record any changes thereof.

In the modification of my invention shown in Figs. 6 and 7, operation of the movable clamping bar 39 for the pointer 1 is controlled by the cams 40, which engage the lower ends of the arms 41 depending from the pivoted U-shaped frame 42 of the clamping bar. Assuming the parts of the mechanism to be in position as shown in Fig. 6 at which both the pointer 1 and the feelers 43 and 44 are in their neutral positions, further rotation of the shaft 45 by the motor 46 effects separation of the feelers to leave the pointer 1 free to move in response to any change of the condition being measured. Specifically the cam 47, as shown most clearly in Fig. 8, effects clockwise rotation of cam follower 48 which is pivoted upon pin 49 extending rearwardly of plate 50. The lower end of cam follower 48 bears against the pin 51 extending rearwardly of the bracket 52 carried by member 53 pivoted upon the shaft 54 extending rearwardly of plate 50. The pin or abutment 55 movable with bracket 52, carried by member 53, bears against plate 56 of the feeler 43 so that the aforesaid clockwise movement of cam member 48 causes the feeler 43 to rotate counter clockwise, moving its tip away from the pointer, i. e., to the left as viewed in Fig. 6. The projecting member 57 carried by or integral with feeler 43 bears against the underside of a similar member 58 carried by or integral with feeler 44 so that as feeler 43 is moved by the aforesaid mechanism away from one side of the pointer, the feeler 44 through movement of feeler 43, is moved away from the other side of the pointer.

A light spring 59 is connected between the bracket 52 and the feeler 43 to bias continuously the plate 56 and pin 55 into engagement with each other. Simultaneously, with the separation of the feelers, the member 53 which carries the bracket 52 is swung by the cam follower 48 in counterclockwise direction. The opposite ends of member 53 carry clutch shoes 60 adapted subsequently to engage the rim of a driven clutch disk 61 secured to the forward end of a shaft 62 corresponding generally to shaft 18 of the preceding modification in that it may carry a slide wire disk 35, and in that its movement may be utilized to operate a controlled member. During this movement, the clutch members are out of engagement and the needle is free.

Substantially immediately after the needle has been clamped, the cam 47 releases the feelers so that the light spring 63 is free to move the feelers toward one another. Assuming that the needle when clamped is to the right of its neutral position, shown in Fig. 6, it arrests movement of feeler 44 whereupon the spring 63 continues to effect movement of the feeler 43 and simultaneously to effect movement of the driving clutch member 53. The movement of the latter brings the left arm of member 53 into the path of resetting cam 64; the greater the deflection of the galvanometer needle to the right, the nearer the left arm of member 53 approaches shaft 45.

After this setting of member 53 from its neutral position in accordance with the galvanometer deflection, the member 50 carrying the feelers and member 53 is rotated in a counter-clockwise direction about pivots 38, as viewed in Fig. 7, by the spring 65 which was previously inoperative because of the engagement between the high portion of cam 66 and the cam engaging member 67 carried by member 50. This movement of member 50 effects engagement between the clutch shoes 60 of the set, driving clutch member 53 and the face of the driven clutch member 61. Shortly thereafter the resetting cam 64 returns the member 53 to its horizontal or neutral position, and because of the engagement with driven clutch member 61 effects rotation of shaft 62 through an angle corresponding to the extent of the deflection of the galvanometer and in a direction determined by the sense of the galvanometer deflection from its neutral position.

During this resetting movement of the clutch members, the needle is free of the clamping action of member 39 and is returned to its neutral position as the feelers 43 and 44 are returned to their neutral position by the resetting cam.

If the needle is to the left of its neutral position when clamped, it is engaged by feeler 43 which in its movement toward engagement with the pointer moves the member 53 to bring its right hand arm into the path of resetting cam 68 so that by operation of the cam in restoring member 53 to its neutral position, shaft 62 is rotated in a reverse direction and to an extent corresponding to the needle's deflection. During the resetting movement of the clutch member the feeler 43 returns the pointer to its neutral position.

As soon as the feelers have returned the pointer to neutral position they again quickly separate, and preferably there is a momentary reclamping of the needle to steady it. This brief clamping action is effected by engagement between the pins 69 and the arms 41 of the frame 42 which carries the clamping member 39.

In the modification of my invention shown in Figs. 10 and 11, the arrangement for clamping the needle is generally similar to that of Figs. 6 and 7; the lower clamping member 70 is intermittently rocked by cams 71 which engage the lower ends of arms 72 depending from the member 70. The ends of arms 72 of this modification, as well as the ends of arms 41 of the prior modification, terminate in bowed resilient members 73 so that undue clamping pressure cannot be exerted upon the needle and so that compensation is made for wear of the parts. As shown, the needle is actually clamped by stretched wires 74, 75 rather than by solid clamping members. This arrangement reduces the wear on the pointer without sacrifice of firm clamping action.

The two plates or disks 76, 77 most clearly shown in Figs. 12 and 12a, are loosely mounted on shaft 78 with their feeler tips 79 and 80 on opposite sides of the pointer 1. In Fig. 10 the feelers and pointer are shown in neutral position. Intermittently, the feeler tips 79 and 80 are separated by the cams 81, 82 which engage respectively the projections 83, 84 of the members 76, 77. After the needle has responded to a change and has been clamped in deflected position, the abutments 83, 84 of the feelers ride off the high parts of cams 81, 82, whereupon the spring 85 having its opposite ends connected to the different feeler members and tensioned by their separation is effective to cause the feeler tips to move towards one another. Upon engagement of either of them with the clamped needle the spring 85 moves the other to bring the arm 83 or 84, depending upon which disk is free, into the path of cam 81 or 82.

During this separation of the feelers and their pointer seeking movement, the feelers were free to rotate independently of each other and independently of shaft 78. However, substantially immediately upon completion of the movement of the free feeler by spring 85, the feeler disks are clamped against each other and against the plate 86 secured to shaft 78. As shown most clearly in Fig. 11 the clamping or clutch mechanism comprises a metallic disk 87, whose periphery is secured to ring 88 and whose central portion is tensioned to clamp the feelers against plate 86. During the aforesaid movement of the feelers independently of shaft 78 the clamping action of the disk is relieved by cam 89 which rocks the arm 90 outwardly as viewed in Fig. 11 to pull the spider 91 connected to disk 87 to relieve the pressure upon the feelers, which in this modification serve also as driving clutch members.

In this form of my apparatus, also, the pointer is mechanically returned to zero during the resetting operation, and preferably immediately after the pointer is returned to zero and the feelers are separated, the needle or pointer 1 is momentarily clamped to steady it, as by engagement between the pins 92 and spring member 73 associated with the lower clamping member.

While I have described several modifications of my invention, it is to be understood that the invention is not limited thereto but is of scope commensurate with the appended claims.

What I claim is:—

1. Apparatus of the character described comprising a deflecting element, means for intermittently clamping said element, a feeler, means for intermittently moving said feeler away from said deflecting element, and spring means effecting return movement of said feeler into engagement with said element while clamped.

2. Apparatus of the character described comprising a deflecting element, means for intermittently clamping said element, a feeler, cam structure for intermittently moving said feeler away from said deflecting element, and spring means for moving said feeler, when released from said cam structure, into engagement with said deflecting element while clamped.

3. Apparatus of the character described comprising a deflecting element, means for intermittently clamping said element, a feeler, means for intermittently moving said feeler away from said deflecting element, spring means effecting return movement of said feeler into engagement with said element while clamped, a driving member moved by said feeler to a setting determined by the position of said element when engaged by the feeler, a driven member, means effecting engagement of said members after each setting of said driving member, and a source of power for actuating the members while engaged to move said driven member to an extent determined by the setting of the driving member.

4. Apparatus of the character described comprising a deflecting element, means for intermittently clamping said element, a feeler, a driving member movable therewith, means for intermittently moving said feeler away from said deflecting element and said driving member from a neutral position, spring means for effecting return movement of the feeler into engagement with the clamped deflecting element to determine the position of the driving member from neutral, a driven member, means for intermittently connecting said driven member to said driving member, and means for effecting return movement of said driving member to neutral while in engagement with said driven member.

5. Apparatus of the character described comprising a deflecting element, means for intermittently clamping said element, a feeler, a driving clutch member movable therewith, means for intermittently moving said feeler away from said deflecting element and said clutch member from a neutral position, spring means for effecting return movement of the feeler into engagement with the clamped deflecting element to determine the position of the clutch member from neutral, a driven member, means intermittently connecting said driven member to said driving member, and cam structure returning said driving member to neutral position while in engagement with said driven member.

6. Apparatus of the character described comprising a deflecting element, means for intermittently clamping said element, a feeler, a driving member movable therewith, cam structure for intermittently moving said feeler away from said deflecting element and said driving member from a neutral position, spring means for effecting return movement of the feeler into engagement with the clamped deflecting element to determine the position of the driving member from neutral, a driven member, means for intermittently connecting said driven member to said driving member, and cam structure returning said driving member to neutral position while in engagement with said driven member.

7. Apparatus of the character described comprising a galvanometer having a pointer deflecting in response to changes in magnitude of a condition, a variable impedance in circuit with said galvanometer means for intermittently clamping said pointer, a driving clutch member, means for intermittently moving said feeler away from said pointer and said driving member from its neutral position, spring means for effecting return movement of the feeler until stopped by the clamped pointer to determine the position of said clutch member from neutral, a driven member mechanically coupled to said impedance, means for intermittently connecting said driven member to said driving member to vary said impedance, and means for returning said driving member to its neutral position while in engagement with said driven member to effect an adjustment of said impedance in accordance with the pointer's deflection.

8. Apparatus of the character described comprising a pointer deflecting from neutral position in response to changes in magnitude of a condition, means for intermittently clamping said pointer, a feeler, means for intermittently moving said feeler away from said pointer, spring means for effecting return movement of said feeler until stopped by the clamped pointer, and means effecting further movement of the feeler while in engagement with the pointer to return the pointer to its neutral position.

9. Apparatus of the character described comprising a pointer deflecting from a neutral position in response to changes in magnitude of a condition, means for intermittently clamping said pointer, a feeler, a clutch member, means for intermittently moving said feeler away from said pointer and said clutch member from its neutral position, means effecting return movement of said feeler until stopped by the clamped pointer to determine the position of said clutch member from neutral position, a second clutch member for intermittently engaging said first clutch member, and means effecting further return movement of said feeler while engaging the pointer to return the pointer to its neutral position and concurrently moving said first clutch member to its neutral position while in engagement with said second clutch member.

10. Apparatus of the character described comprising a pointer deflecting from neutral position in response to changes in magnitude of a condition, means for intermittently clamping said pointer, a feeler, a clutch member, means for moving the feeler into engagement with the clamped pointer to set said clutch member, a second clutch member for intermittently engaging said first clutch member, and means for moving the feeler to neutral position and concurrently moving the engaged clutch members to an extent determined by the setting of the first clutch member.

11. Apparatus of the character described comprising a deflecting pointer, means for intermittently clamping said pointer, a feeler for engaging said pointer while clamped, means for oscillating said feeler, intermittently engaged clutch members mounted concentrically with said feeler, one of said members while free being set to a position determined by engagement of the pointer with the feeler, and means for moving said clutch members while engaged to an extent determined by the setting of said one of them.

12. Apparatus of the character described comprising a deflecting pointer, means for intermittently clamping said pointer, an oscillating feeler for engaging said pointer while clamped, a driven clutch member mounted concentrically with said feeler, a driving clutch member movable with said feeler, the engagement of the feeler with the pointer determining the setting of the driving clutch member, and means for rotating said driving clutch member, after being set and while engaging said driven member, through an angle determined by its setting.

13. Apparatus of the character described comprising a deflecting pointer, means for intermittently clamping the pointer, a pivoted feeler, means for intermittently moving said feeler from the pointer, spring means for returning the feeler until arrested by the clamped pointer, a rotatable member mounted concentrically with said feeler, means effecting driving engagement between said member and the arrested feeler, and means for thereafter rotating said feeler while engaged by said member through an angle determined by its arrested position.

14. Apparatus of the character described comprising a pointer deflecting from neutral position in response to changes in magnitude of a condition, means intermittently clamping said pointer, a feeler adapted to engage and be arrested by the pointer when clamped on either side of its neutral position, intermittently engaged clutch members, one of which is set with respect to the other by movement of the feeler to engage the clamped pointer, and means for moving the clutch members while engaged to an extent determined by the setting of said one of them.

15. Apparatus of the character described comprising a pointer deflecting from neutral position in response to changes in magnitude of a condition, means intermittently clamping said pointer, a feeler adapted to engage and be arrested by the pointer when clamped on either side of its neutral position, a member movable with said feeler and set thereby to one side or the other of its neutral position depending upon the sense of position of the clamped pointer from its neutral position, means for resetting said member to its neutral position from a setting on either side thereof, and a second member disengageably connected to said first member for movement therewith during operation of said resetting means.

16. Apparatus of the character described comprising a pointer, a feeler, means for moving said feeler from said pointer to a position not less than the limiting position of said pointer for movement in one direction, spring means for biasing said feeler for movement to a position substantially corresponding to the limit of movement of the pointer in the opposite direction and moving said feeler until arrested by the clamped pointer, a clutch member set in accordance with the pointer-engaging movement of said feeler, resetting means for moving said clutch member to an extent determined by its setting, and a controlled member disengageably connected to said clutch member for movement therewith during operation of said resetting means.

17. Apparatus of the character described comprising a pointer deflecting from neutral position in response to changes in magnitude of a condition, means for clamping said pointer, a feeler, spring means for moving the feeler until arrested by the clamped pointer, and means for subsequently moving the feeler while engaging the released pointer to return it to neutral position, said clamping means momentarily reclamping the pointer upon termination of said movement.

18. Apparatus of the character described comprising a pointer, a pair of feelers, means for intermittently moving said feelers away from each other on opposite sides of the pointer, spring means for biasing said feelers toward each other and for moving either of said feelers when the other engages said movable member, and controlled structure movable with one of said feelers.

19. Apparatus of the character described comprising a pointer, means for intermittently clamping the pointer, a feeler on one side of the pointer, means for moving said feeler away from said pointer, a second feeler on the other side of the pointer and moved therefrom by said first feeler, and spring means for biasing said feelers toward each other and for moving either of said feelers when the other engages the clamped pointer.

20. Apparatus of the character described comprising a pointer adapted to deflect from a neutral position, means for intermittently clamping the pointer, a pair of feelers, means for intermittently moving said feelers toward and away from each other on opposite sides of the pointer, the clamped pointer arresting one or the other of said feelers depending upon the sense of its deflection from neutral, and means for mechanically returning the pointer to its neutral position including the arrested feeler.

21. Apparatus of the character described comprising a pointer adapted to deflect from a neutral position, means for intermittently clamping the pointer, a pair of feelers, means for intermittently moving said feelers away from each other on opposite sides of the pointer, spring means for biasing said feelers toward each other and for effecting movement of either of them when the other is arrested by the clamped pointer, and means including said feelers for mechanically returning the pointer to neutral position.

22. Apparatus of the character described comprising a pointer, driving and driven clutch members, a support for one of said members, means for intermittently moving said support to effect engagement of said members, and a feeler for engaging said pointer to set said one of said members, carried by said movable support.

23. Apparatus of the character described comprising a pointer, a rockable support, a driving clutch member carried thereby, a pair of feelers for engaging said pointer carried by said support and cooperatively related to said driving clutch member whereby they are adapted to set it in accordance with the pointer's deflection, a driven clutch member, and means for rocking said support to effect engagement between the driven clutch member and the set driving clutch member.

24. Apparatus of the character described comprising a pointer, means for intermittently clamping the pointer, a rockable support, a driving clutch member carried thereby, means for setting said clutch member comprising a pair of feelers carried by said support, means for intermittently moving said feelers away from each other, spring means for biasing said feelers toward each other and for effecting movement of one of said feelers when the other is arrested by the clamped pointer, a driven clutch member, and means for rocking said support to effect engagement between the clutch members for movement to an extent determined by the setting of the driving clutch member.

25. Apparatus of the character described comprising a pointer, means for intermittently clamping said pointer, a pair of feelers for intermittently engaging the clamped pointer, driving clutch members movable with the feelers, and set thereby in accordance with the pointer's deflection, a driven clutch member, means for intermittently connecting said driven clutch member to said driving clutch members, and means for selectively moving the driving clutch members to an extent determined by the setting and while connected to said driven clutch member.

26. Apparatus of the character described comprising a pointer, means for intermittently clamping said pointer, a pair of feelers, a pair of cams intermittently moving said feelers away from each other on opposite sides of the pointer, spring means for biasing the feelers toward each other and for moving the free feeler when the other is arrested by the clamped pointer, driving clutch members movable with the feelers, driven clutch structure intermittently connected to said driving members, and resetting cam structure engaging and moving the driving clutch member set by the free feeler while having driving connection with the driven clutch structure.

27. Apparatus of the character described comprising a pointer, means for intermittently clamping the pointer, a pair of concentric plates carrying feelers disposed on opposite sides of the pointer, means for intermittently rotating the plates in opposite directions to separate the feelers, resetting cam structure, spring means for biasing said feelers toward each other and for rotating one of said plates, when the feeler of the other is arrested by the clamped pointer, to position a member carried thereby in the path of the resetting cam structure, and a controlled member connected to at least said one of said plates during its resetting by said structure.

28. Apparatus of the character described comprising a pointer, means for intermittently clamping the pointer, a pair of concentric plates carrying feelers disposed on opposite sides of the pointer, a driven member mounted concentric with said plates, a spring disc for clamping said plates to said driven member, means intermittently relieving said plates from the clamping pressure of said disc, and means for effecting relative movement of the unclamped plates for locating the clamped pointer by the feelers.

29. Apparatus of the character described comprising an element deflecting from a neutral position in response to changes in magnitude of a condition, means for intermittently clamping said element, driving and driven members, a feeler, and means for moving said feeler beyond said neutral position until arrested by the clamped element, said feeler for its movement beyond neutral effecting relative movement of said driving and driven members.

30. Apparatus of the character described comprising an element deflecting from a neutral position in response to changes in magnitude of a condition, means for intermittently clamping said element, driving and driven members, feelers on opposite sides of said element, and means for moving said feelers toward each other while said element is clamped, the movement of either of said feelers beyond said neutral position effecting relative movement of said driving and driven members, in one direction or the other in accordance with the sense of deflection of said element from neutral.

31. Apparatus of the character described comprising an element deflecting from a neutral position in response to changes in magnitude of a condition, means for intermittently clamping said element, a driving member having a neutral position, a driven member, a feeler, means for moving said feeler beyond the neutral position of said element until engaged by the clamped element, said feeler for its movement beyond said first neutral position effecting movement of said driving member from its neutral position relative to said driven member, and means for subsequently returning said driving member to its neutral position while engaged by said driven member.

32. Apparatus of the character described comprising a deflecting element, means for intermittently clamping said element, a pair of feelers on opposite sides of said element, means for intermittently moving said feelers simultaneously away from said deflecting element, and spring means connecting said feelers and adapted to effect their return toward engagement with said element while clamped.

HAROLD R. RANKEN.

DISCLAIMER 1,934,882.—*Harold R. Ranken*, Philadelphia, Pa. MEASURING APPARATUS. Patent dated November 14, 1933. Disclaimer filed November 13, 1934, by the assignee, *Leeds and Northrup Company*.

Therefore, enters this its disclaimer to claims 1, 2, 12, and 32 of said Letters Patent, which are in the following words:

"1. Apparatus of the character described comprising a deflecting element, means for intermittently clamping said element, a feeler, means for intermittently moving said feeler away from said deflecting element, and spring means effecting return movement of said feeler into engagement with said element while clamped.

"2. Apparatus of the character described comprising a deflecting element, means for intermittently clamping said element, a feeler, cam structure for intermittently moving said feeler away from said deflecting element, and spring means for moving said feeler, when released from said cam structure, into engagement with said deflecting element while clamped."

"12. Apparatus of the character described comprising a deflecting pointer, means for intermittently clamping said pointer, an oscillating feeler for engaging said pointer while clamped, a driven clutch member mounted concentrically with said feeler, a driving clutch member movable with said feeler, the engagement of the feeler with the pointer determining the setting of the driving clutch member, and means for rotating said driving clutch member, after being set and while engaging said driven member, through an angle determined by its setting."

"32. Apparatus of the character described comprising a deflecting element, means for intermittently clamping said element, a pair of feelers on opposite sides of said element, means for intermittently moving said feelers simultaneously away from said deflecting element, and spring means connecting said feelers and adapted to effect their return toward engagement with said element while clamped."

[*Official Gazette December 4, 1934.*]